INVENTORS
E. E. BERKAU
W. R. HOCUTT

ATTORNEY

EFFECT OF PREPOLYMER MOLECULAR WEIGHT AND COOH/OH RATIO ON EASE OF POLYMERIZATION

CHARACTERIZATION OF POLYMERIZATION PROPERTIES OF PREPOLYMERS

INVENTORS
E. E. BERKAU
W. R. HOCUTT

BY

ATTORNEY 3,551,386
POLYESTER POLYMERIZATION PROCESS,
PREPOLYMER AND PRODUCT
Eugene E. Berkau, Durham, and William R. Hocutt,
Raleigh, N.C., assignors to Monsanto Company, St.
Louis, Mo., a corporation of Delaware
Filed June 26, 1968, Ser. No. 750,386
Int. Cl. C08g 17/003
U.S. Cl. 260—75                                   5 Claims

ABSTRACT OF THE DISCLOSURE

Partially esterified low molecular weight linear polyester prepolymers especially suitable for substantially facilitated single-step transesterification and further esterification in production of high quality high molecular weight polyester polymers are produced with increased efficiency by partially esterifying a dicarboxylic acid with a glycol under acid esterification conditions which foster a molecular weght of from about 500 to about 10,000 and a free carboxyl end group concentration of between about $1.6(10^5)M_n^{-0.98}$ and $6.7(10^6)M_n^{-1.35}$ (where $M_n$=number average molecular weight of the prepolymer).

If the esterification is conducted at atmospheric pressure the ratio of carboxyl end groups to hydroxyl end groups in the improved prepolymer of a molecular weight of from about 1000 to 1800 units will be from about 0.20 to 0.46.

BACKGROUND OF THE INVENTION

High molecular weight linear polyesters have been produced on a commercial scale by an ester interchange process. For example, in the production of highly polymeric linear polyethylene terephthalate, the dimethyl ester of terephthalic acid is heated with an excess of ethylene glycol in the presence of an ester interchange catalyst to produce the bis glycol ester of terephthalic acid, methyl alcohol and excess ethylene glycol being distilled off. The product is then polymerized by a condensation reaction with the elimination of ethylene glycol by heating the product with a catalyst at elevated temperatures and under reduced pressures until a high molecular weight product is formed.

High molecular weight linear polyesters have also been produced by the direct esterification process. For example, in the production of highly polymeric linear polyethylene terephthalate, terephthalic acid may be heated with ethylene glycol to form the diglycol ester and low polymer thereof which can then be polymerized by heating in the presence of a catalyst under reduced pressures to form a high molecular weight product. The prior art ordinarily contemplates essentially complete esterification in the prepolymer before the final polymerization step. The esterification is accomplished in two distinct reaction zones. In the first reaction zone, terephthalic acid and ethylene glycol were reacted to yield a prepolymer product having a 50 to 90% esterification of the carboxyl end groups present and a molar ratio of ethylene glycol to terephthalic acid of less than 1 to 1. This product was then reacted in a second zone where essentially complete esterification was accomplished by the introduction of additional ethylene glycol. This second reaction product was characterized by 99/100% esterification of the carboxyl end groups present and a ratio of ethylene glycol to terephthalic acid of greater than 1.1/1.0.

Examples of these prepolymers were characterized by carboxyl end group concentrations of 30–60 µeq./gram and hydroxyl end group concentrations of 1000–4000 µeq./gram. Average molecular weights range from 500 to 2,000. The prepolymers were fed into a third reaction zone where polymerization consisting essentially of transesterification took place, producing polymers, for staple end use, for example, of a polymeric weight range of 17,500–18,500.

Typical operating conditions for a three-stage polyester process using an excess of ethylene glycol in the first stage would include a first stage reaction zone characterized by atmospheric or super-atmospheric pressures and temperatures ranging from 220° to 300° C.; a second stage raction zone with atmospheric or sub-atmospheric pressures (or the equivalent to ethylene glycol vapor pressures), and somewhat higher temperatures than the first reaction zone, e.g., 250–300° C.; and a third reaction zone involving high vacuums (or the equivalent ethylene glycol vapor pressures) and still higher temperatures ranging 275° C. to 310° C. The polymerization phase of the prior art polyester process is the slowest and most expensive, the high vacuum accounting, to a large degree, for the expense of production.

Efforts have been made to produce successful prepolymers of lower molar ratios of ethylene glycol to terephthalic acid. Some have been produced with a degree of esterification of from about 90 to 99%; and it has been stated that these prepolymers are eminently suitable for further polymerization into high molecular weight polyesters. These efforts, while partly or occasionally successful as explained below, have fallen short of a complete measure of success by their failure to recognize certain critical parameters required of the prepolymer for consistently successful polymerization in the finisher.

Under other than ideal conditions the polymerization phase of the prior art polyester process is by far the slowest and most expensive, the high vacum requirements therefore accounting, to a large degree, for the expense of production.

SUMMARY OF THE INVENTION

It is an object of this invention to describe the production of a prepolymer suitable for polymerizatien into polyester polymers of molecular weights suitable for fibers, filaments, films and the like.

It is a second object of this invention to facilitate the production of high molecular weight polyester polymers by using a prepolymer having the critical characteristics which permit efficient polymerization.

Briefly, the objects of this invention are accomplished by using as a prepolymer product a partially esterified low molecular weight polymer mixture, having the critical carboxyl end group concentration (µeq./gm.) in relation to the number average molecular weight of the prepolymer which is between $1.6(10^5)M_n^{-0.98}$ and $$6.7(10^6)M_n^{-1.35}$$

(where $M_n$=number average molecular weight of the prepolymer).

This characteristic may also be described in terms of the ratio of carboxyl to hydroxyl end group concentrations at a given molecular weight of the prepolymer. The prepolymer can be prepared in a 1-step process; and the product can be fed directly into a finisher for polymerization.

The significance of the above described end group ratio in facilitating polymerization is explained by the types of reactions occurring in the process, and the conditions under which these reactions most easily proceed. Trans-esterification is the splitting out of a glycol molecule between two hydroxyl-terminated prepolymer molecules. Esterification is the reaction of a carboxyl end group with a hydoxyl end group to eliminate a water molecule. The esterification reaction is favored at relatively low molecular weights and high carboxyl end group concentrations. If the carboxyl end-group concentration in the prepolymer is too low to favor the esterification reaction, the overall polymerization rate will be accordingly lower. It is this initially higher polymerization rate which explains one of the advantages in using the prepolymer of this invention over the prepolymers described in the prior art.

There are other possible explanations for the increased rate of polymerization at critical ratios of carboxyl/hydroxyl end groups. Since the water molecule is formed during esterification, and the glycol molecule is formed during trans-esterification, and the rate of diffusion of a water molecule is greater than that of a glycol molecule, the principles of diffusion favor a polymerization in which there is both esterification and transesterification. The rate of esterification, by the chemical activity of species, is higher than that of transesterification. Either or both of these factors may account in part for the facility of polymerization in accordance with this invention.

The critical nature of the carboxyl/hydroxyl end group ratio can only be explained either alone or in conjunction with these additional factors, by the creation of end-group concentrations which favor transesterification and esterification simultaneously in the finisher. Whatever the reason it has been found that the concentration of the carboxyl end group for a given molecular weight is critical; that in molecular weight ranges of from 1000 to 1800 units the prepolymer rates of polymerization sharply increase as the ratio of the carboxyl end groups to the hydroxyl end group ranges upwards from about .05; and that where the ratio exceeds .46, and there are insufficient hydroxyl end groups to support both reactions, the polymerization rate decreases abruptly.

To further understand the invention reference will be made to the attached drawing that forms part of the present application.

Figure 1:
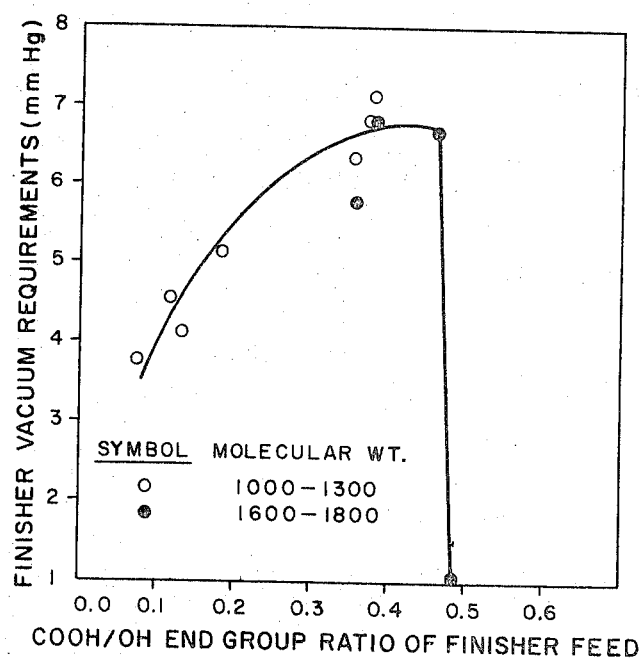
FIG. 1 is a graph showing finisher response to prepolymers of different carboxyl/hydroxyl end group ratios.

Other objects and advantages of this invention will be apparent from the description which follows.

DESCRIPTION OF THE EMBODIMENT

The synthetic linear condensation polyester contemplated in the practice of this invention are those formed from dicarboxylic acids and glycols, and copolyesters or modifications of these polyesters and copolyesters. In a highly polymerized condition, these polyesters and copolyesters can be formed into filaments and the like.

The polyesters and copolyesters specifically useful in the instant invention are those resulting from heating one or more of the glycols of the series $HO(CH_2)_nOH$, in which $n$ is an integer from 2 to 10, with one or more dicarboxylic acids. Among the dicarboxylic acids useful in the present invention are terephthalic acid, isophthalic acid, sebacic acid, adipic acid, p-carboxyphenylacetic acid, succinic acid, p,p'-dicarboxybiphenyl, p,p'-dicarboxyphenylcarbanilide, p,p'-dicarboxyphenylthiocarbanilide, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyphenoxyheptanoic acid, p,p'-dicarboxydiphenylmethane, p,p'-dicarboxydiphenylethane, p,p' - dicarboxydiphenylpropane, p,p'-dicarboxydiphenylbutane, p,p'-dicarboxydiphenylpentane, p,p'-dicarboxydiphenylhexane, p,p' - dicarboxydiphenylheptane, p,p'-dicarboxydiphenyloctane, p,p' - dicarboxydiphenoxyethane, p,p' - dicarboxydiphenoxypropane, p,p' - dicarboxydiphenoxybutane, p,p'-dicarboxydiphenoxypentane, p,p'dicarboxydiphenoxyhexane, 3-alkyl - 4 - (beta-carboxyethoxy) benzoic acid, oxalic acid, glutaric acid, pimelic acid, suberic acid, azelaic acid and the dioxy acids of ethylene dioxide having the general formula

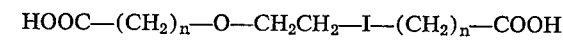

$$HOOC-(CH_2)_n-O-CH_2CH_2-I-(CH_2)_n-COOH$$

wherein $n$ is an integer from 1 to 4, and the like. Examples of the glycols which may be employed in practicing the instant invention are ethylene glycol, trimethylene glycol, tetramethylene glycol, decamethylene glycol and the like. Polyethylene terephthalate, however, is preferred because of the ready availability of terephthalic acid and ethylene glycol, from which it is made. It also has a relatively high melting point (cross filament fusion) of about 250 through 265° C. and this property is particularly desirable in the manufacture of filaments in the textile industry.

Considering the many known variations of starting materials, apparatus and reaction conditions as well as the numerous possible combinations thereof, it is logically impractical, in describing such reactions, to include all possible combinations of variables. Accordingly, only general parameters and considerations can be given in describing generically the reactor conditions in the process of the instant invention.

The esterification reactor may be of any type known in the art. The feed make-up of the reactor, subject to qualifications described below, is of any known combination suitable for direct esterification. As is well known in the art, the dicarboxylic acid and the glycol selected may be added to the reaction vessels separately or mixed together and then added to the reaction vessel. Catalysts may be employed or not as desired. Initial starting pressures may or may not be used to initiate the reaction between the acid and the glycol, and the entire esterification reaction may or may not be conducted under pressure, although the practice of the instant invention is entirely suitable for the normally preferable esterification at atmospheric pressure. A solvent comprised of glycol esters of the dicarboxylic acid used and polymers thereof may be employed in lieu or in addition to starting pressures to facilitate the reaction.

As used herein, the term polymerizer or esterifier includes any polymerization reactor, and the term finisher is limited in meaning to a polymerization reactor in which the ultimate polymerization step in a polyester process is conducted.

Certain general rules concerning reactor conditions are applicable to all types of reactors. It is well known for example that as the temperature and pressure increase, other conditions remaining constant, the rate of esterification will increase. It is also known that at atmospheric pressure and any temperature beyond the melting point of the reactants, a product residence time can be selected so that a single vessel esterifier will produce a prepolymer product of a molecular weight of less than about 1800 units. For most reactors it would suffice, in selecting optimum conditions for producing prepolymers within the critical range of carboxyl concentration, to select the normally desirable atmospheric pressure and a temperature which will favor a reasonably high reaction rate without causing an intolerable diethylene glycol concentration in the prepolymer. Having selected the pressure and tentatively selected the temperature, by employing an arbitrary but conservatively high minimum input molar ratio of ethylene glycol to terphthalic acid, the product residence time can then be reduced from an arbitrary high in order to downwardly adjust the carboxyl/hydroxyl ratio to a value of 0.46 or less. If such a downward adjustment should result in an excess of ethylene glycol in the system, the molar ratio of the input feed slurry should accordingly be reduced.

In a single vessel stirred-tank reactor esterification system using a fixed input feed slurry having a molar ratio of ethylene glycol to terephthalic acid of 2–1, it was found that at a given temperature the initial reaction rate of esterification was very rapid; but that after 80–90% completion of esterification was obtained, the rate decreased and approached zero at 95–96% of acid esterification. It was observed that in this system an excessive product residence time resulted in an increase in the concentration of diethylene glycol if the temperature was held constant; and that if the temperature was increased, other conditions being constant, there was also an increase in the concentration of diethylene glycol. If the esterification reaction was conducted under pressure the diethylene glycol concentration was significantly increased. There was a decrease in the carboxyl/hydroxyl ratio as product residence time was increased and once approximately 90% acid esterification was obtained, further increase in product hold-up time decreased the carboxyl/hydroxyl ratio, but did not significantly affect the molecular weight of the prepolymer. With pressures constant (atmospheric), there was a direct relationship between product residence time and esterification temperature in maintaining a carboxyl/hydroxyl ratio of less than .46.

With the use of a fixed input molar ratio of ethylene glycol to terephthalic acid, adjustment of the reacting ratio during the course of esterification can be made by regulating product residence time, temperature or pressure, and therefore the amount of distillate. The reacting ratio can also be adjusted by changing the input molar ratio.

As changes are made in operating conditions, in the process of selecting of optimum conditions, samples of the prepolymer product are analyzed for carboxyl concentration and molecular weight. As is well known in the art, the carboxyl end group concentration can be determined by titration of the prepolymer with potassium hydroxide. When polymerization has been conducted at constant volume, number average molecular weight can be calculated by stoichiometry, and under conditions of varying quantities by material balance or by vapor pressure osmometry, as is well known in the art.

Rapid testing of the prepolymer for molecular weight may be made by measuring specific viscosity and utilizing analytically obtained relationships and predetermined data (based on stoichiometry or vapor pressure osmometry) for determining number average molecular weight. For example, by measuring specific viscosity ($\eta sp$) at a given concentration (½–4%) of the prepolymer in a solvent having a molar ratio: 2 phenol/1 trichlorophenol, the intrinsic viscosity ($\eta$) is then calculated using the relationship $$[\eta] = (\sqrt{2/c})[\eta_{sp} - ln\eta_{rel}]^{1/2} \eta_{rel} = 1 + \eta sp$$

The viscosity average molecular weight can then be calculated from the instrinsic viscosity using the following relationship.

$$M_v = 7.86 \times 10^4 [\eta]^{1.54}$$

And the number average molecular weight ($M_n$) is obtained by dividing the viscosity average molecular weight ($M_v$) by 2.3, an analytically determined factor.

The mathematical relationships of the carboxyl end group concentration to the hydroxyl end group concentration is shown as follows: As is known from its structure, number average molecular weight ($M_n$) of the prepolymer is $$M_n = 2/(OH_F + COOH_F) \qquad (1)$$

where $OH_F$ = free hydroxyl end group concentration (eq./gm.)
$COOH_F$ = free carboxyl end group concentration (eq./gm.)

Since $M_n$ and COOH can be measured or determined as described above, the hydroxyl end group concentration can be calculated by rearranging Equation 1 to give $$OH_F - (2/M_n) - COOH_F$$

When the samples indicate that the carboxyl end group concentration is within the critical limitation given above for the particular number average molecular weight of the prepolymer, the prepolymer is one which will further polymerize by both esterification and transesterification in a polymerizer with drastic and unforeseeably improved facility. This facility of polymerization in a finisher is illustrated dramatically in graphic form at FIG. 1, where the molecular weights of the samples measured are in a range typical of one vessel atmospheric esterification products. The figures show that as the carboxyl/ hydroxyl end group ratio increases from about .05 to about .30 there is a substantial decrease in finisher vacuum requirements, and that these requirements remain essentially constant at ratios of from about .30 to .46 whereupon, if the ratio is further increased, there is an abrupt increase in finisher vacuum requirements or, in other words, a decrease in the rate of polymerization.

Figure 2:
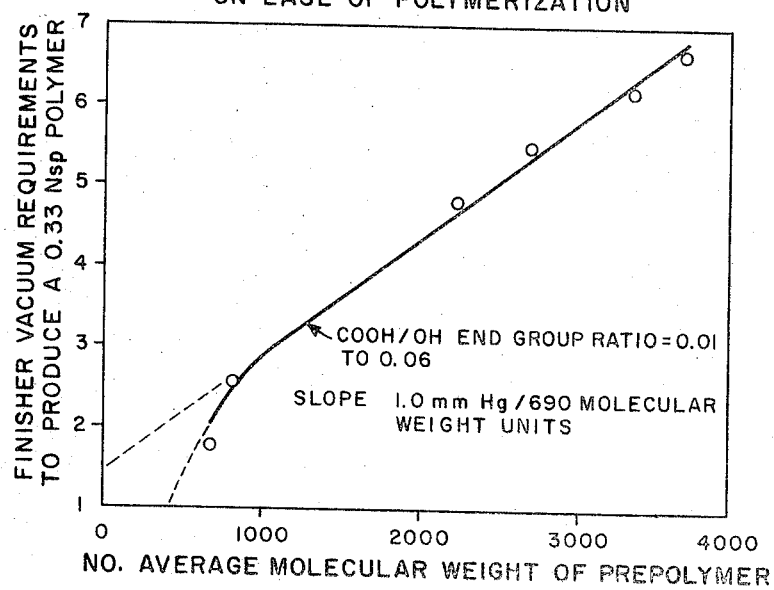
FIG. 2 is a graph showing the effect of prepolymer molecular weight on ease of polymerization.

The significance of these reduced finisher vacuum requirements or increased rate of polymerization is partially explained in terms of finisher requirements for prepolymers of various molecular weights as shown in FIG. 2. Sample prepolymers used to compile data for FIG. 2 were completely esterified. The figure shows that when the prepolymer molecular weight is in the range of 700 to 5000, for every 690 units increase in the molecular weight of the prepolymer, the finisher vacuum requirements can be reduced 1 millimeter Hg; and when the prepolymer molecular weight is less than 700, the finisher vacuum requirements increase substantially, approaching absolute 0 for a prepolymer whose molecular weight is similar to that for the half/ester of terephthalic acid, or 210 units.

It is readily apparent, therefore, that FIG. 1 only partially explains the significance of the equation given above for determining, in terms of number average molecular weight and carboxyl concentration, the prepolymer which will show such drastically improved finishing as depicted in FIG. 1. The molecular weights shown in FIG. 1 are within a limited range.

Figure 3:
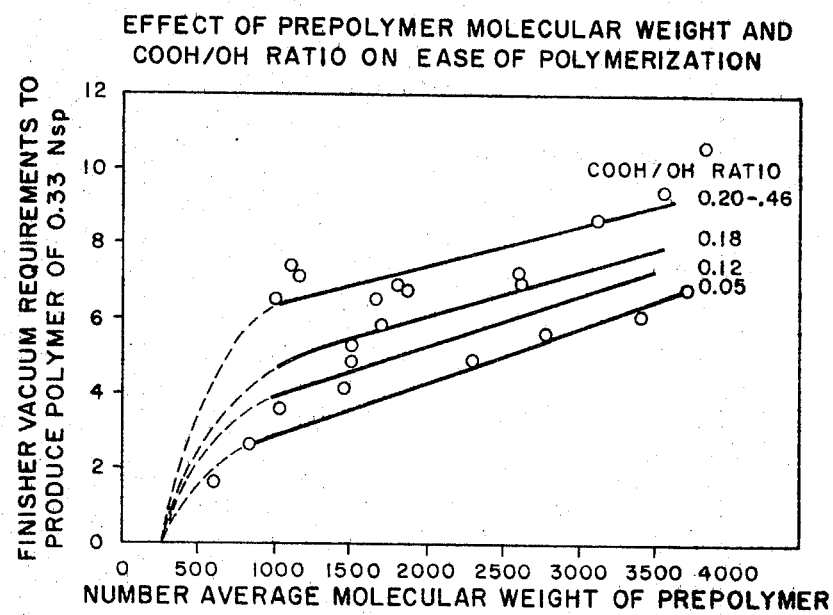
FIG. 3 is a graph showing the effect of prepolymer molecular weight and carboxyl/hydroxyl ratio on ease of polymerization.

FIG. 3 shows graphically the effect of change of molecular weights of prepolymers having various carboxyl/ hydroxyl end group ratios on finisher vacuum requirements in producing a polymer of a viscosity of .33. As shown by the figure, at a given prepolymer molecular weight, the finisher vacuum requirements are seen to decrease to a minimum as the carboxyl/hydroxyl ratio increases to about .20. Comparing prepolymers having carboxyl/hydroxyl ratios of .20 to .46 with those having values of .05 or less, the figure shows that the latter require about 3.0 millimeters Hg more vacuum, but that the differential decreases as the molecular weight increases.

It can be concluded that a prepolymer whose carboxyl/hydroxyl ratio lies in the range of 0.20 to 0.46 will polymerize at a faster rate than corresponding prepolymers of lower carboxyl/hydroxyl ratios, but as the molecular weight of the prepolymer increases the upper and lower curves in FIG. 3 approach each other and in fact intersect at about 10,000 molecular weight. This result is to be expected since the carboxyl end groups are preferentially reacted under polymerization conditions. After the carboxyl end groups reach a certain minimum value, no more esterification reaction will occur, and therefore no further increase in the polymerization reaction rate would be anticipated. As the prepolymer molecular weight approaches 10,000, the differences between prepolymers in ease of polymerization becomes insignificant.

Figure 4:
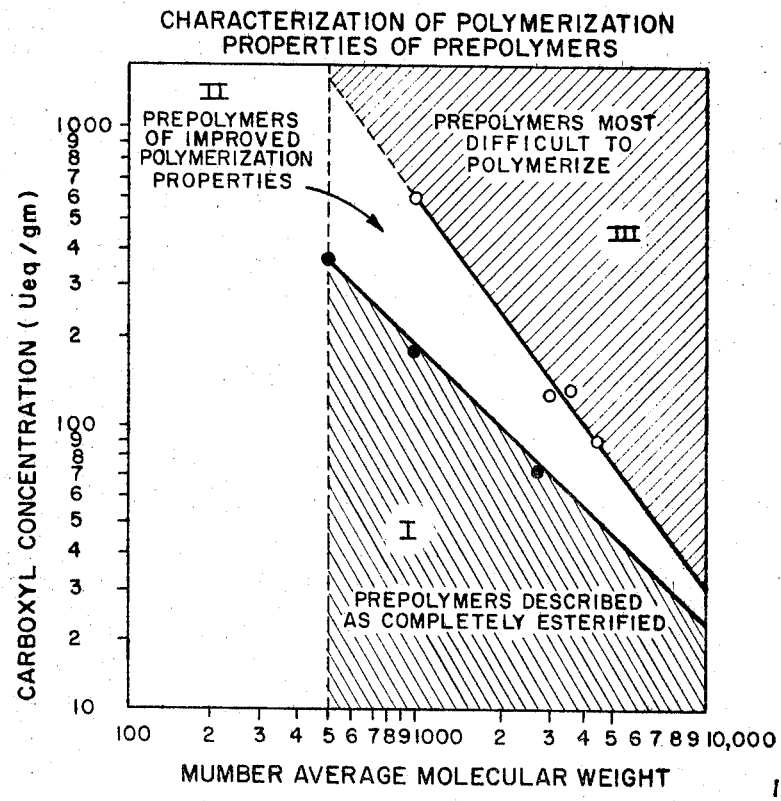
FIG. 4 is a graph showing the characterization of polymerization properties of prepolymers.

FIG. 4 shows, in terms of number average molecular weight and carboxyl concentration, the three regions which represent the chemical characterization of prepolymers. Region I represents prepolymers which are described as completely esterified, that is, have a carboxyl/hydroxyl end group ratio of less than 0.10 or a carboxyl concentration of equal to or less than 30 microequivalents per gram. Region II represents prepolymers of improved polymerization properties or relatively high carboxyl end group concentrations which are prepared in accordance with the instant invention. Region III includes those ranges of prepolymers whose hydroxyl end group concentrations are so low that transesterification, along with esterification cannot be supported adequately. At a molecular weight of about 10,000 the three regions merge into one, but this is only theoretical significance under the present state of the art of preparing polyester polymers. The expression of critical range of carboxyl concentrations in terms of molecular weight of the prepolymer, to which the specification and claims are limited, is derived from FIG. 4 as follows.

Minimum carboxyl concentration (COOH) as a function of molecular weight ($M_n$)

(1) $COOH = 360$ μeq./gm.
$M_n = 500$ (2) $COOH = 74$ μeq./gm.
$M_n = 2,500$ (1) $Log_e COOH = Log_e a' + b' Log_e M_n$
$Log_e 360 = Log_e a' + b' Log_e 500$
$5.88 = Log_e a' + b' \cdot 6.21$ (2) $Log_e 74 = Log_e a' + b' Log_e 2,500$
$4.30 = Log_e a' + b' \cdot 7.85$
$1.58 = 1.61 b'$
$b' = -0.98$
$Log_e a' = 5.88 - (-0.98)(6.21)$
$Log_e a' = 11.97$
$a' = e^{11.97}$
$a' = 1.6(10^5)$
$COOH_{min} = 1.66 \times 10^5 M_n^{-0.98}$ (μeq./gm.)
$COOH_{min} = 1.6(10^5) M_n^{-0.98}$ or $COOH_{min} \leq COOH \leq COOH_{max}$ or $1.6(10^5) M_n^{-0.98} \leq COOH \leq 6.7(10^6) M_n^{-1.35}$ for $M_n \leq 10,000$ In order to further explain the significance of the critical carboxyl/hydroxyl ratio, a two phase reactor was used to measure the characteristics of polymers of intermediate molecular weights (2,000–5,000), and to permit comparison with corresponding polymers at high molecular weights. The results of these measurements are shown by the following table in which prepolymers utilized had molecular weights from about 700 to 1200, and the end products of the polymerizer were of molecular weights of about 18,500. The table also shows the percentage of reactions in each phase which were esterification as opposed to transesterification reactions.

TABLE 1

| | Prepolymer | | Intermediate | | | Polymer | | |
|---|---|---|---|---|---|---|---|---|
| | $M_n$ | COOH/OH | $M_n$ | COOH/OH | Esterification reactions, percent | $M_n$ | COOH/OH | Esterification reactions, percent |
| | 1,110 | 0.37 | 2,620 | 0.20 | 70 | 18,500 | 0.44 | 29 |
| | 1,144 | 0.45 | 3,120 | 0.22 | 77 | 18,500 | 0.59 | 28 |
| | 1,205 | 0.45 | 3,530 | 0.26 | 73 | 18,500 | 0.77 | 31 |
| | 1,130 | 0.39 | 3,820 | 0.21 | 66 | 18,500 | 0.71 | 23 |
| Average | (1,140) | (0.42) | | | (71) | (18,500) | (0.67) | (31) |
| | 725 | 0.25 | 1,240 | 0.12 | 60 | 18,500 | 0.29 | 19 |
| | 739 | 0.28 | 2,340 | 0.05 | 59 | 18,500 | 0.23 | 6 |
| | 739 | 0.28 | 2,780 | 0.05 | 56 | 18,500 | 0.21 | (1) |
| | 752 | 0.27 | 3,400 | 0.05 | 52 | 18,500 | 0.30 | (1) |
| | 739 | 0.28 | 3,685 | 0.06 | 52 | 18,500 | 0.32 | 5 |
| Average | (739) | (0.27) | | | (56) | (18,500) | (0.27) | (6) |

[1] Negligible.

Maximum carboxyl concentration (COOH) as a function of molecular weight ($M_n$)

$Log_e COOH = a + b Log_e M_n$ (1) $COOH = 580$ μeq./gm.
$M_n = 1000$ (2) $COOH = 90$ μeq./gm.
$M_n = 4000$ $Log_e 580 = Log_e a + b Log_e 1000$
(1) $6.37 = Log_e a + b \cdot 6.91$
$Log_e 90 = Log_e a + b Log_e 4000$
(2) $4.50 = Log_e a + b \cdot 8.30$
$1.87 = -1.39 b$
$b = -1.35$
$Log_e a = 6.37 - (-1.35) 6.91$
$a = e^{15.71}$
$a = 6.7(10^6)$
$COOH = 6.7(10^6) M_n^{-1.35}$ (μeq./gm.)
$COOH_{max} = 6.7(10^6) M_n^{-1.35}$ As shown by Table 1, in the production of prepolymers of 2000 to 4000 molecular weight, esterification counts for 52–77% of the total polymerization reactions which includes both esterification and transesterification. In further converting these intermediate products to high molecular weight polymers, the esterification accounts for only a negligible amount to 31% of the total reactions. Total esterification reactions occurring in producing the final polymers from the prepolymers shown in Table 2 runs from 42 to 58% of the total reactions.

Figure 5:
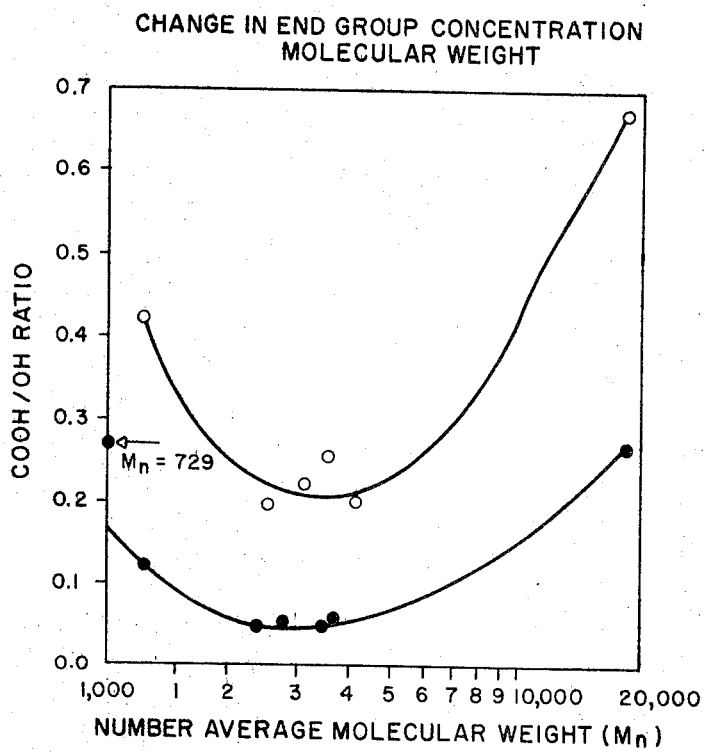
FIG. 5 is a graph showing the change in end group concentration of prepolymers with molecular weight.
Figure 6:
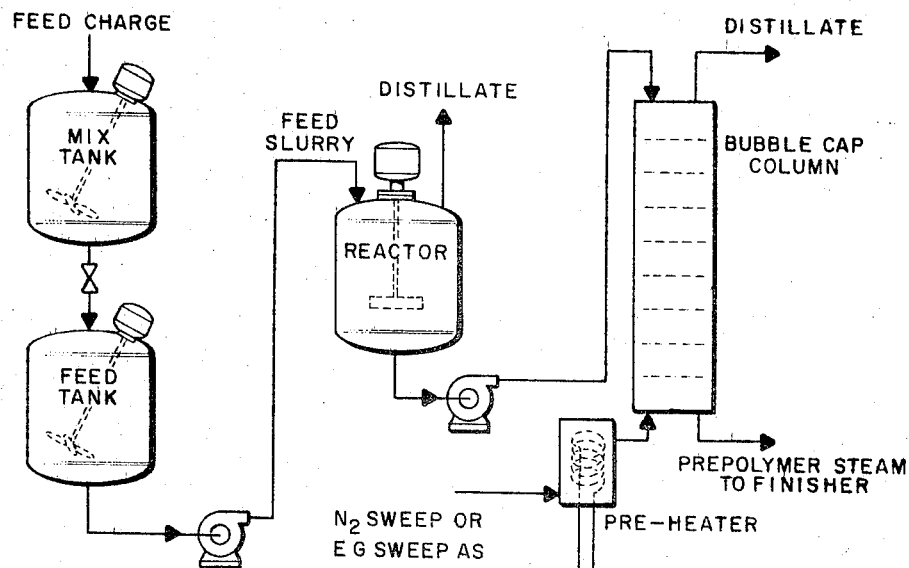
FIG. 6 is a flow sheet depicting a preferred method of practicing the prepolymer production step in accordance with the instant invention.

Further evidence that esterification increases the initial polymerization rate is shown in FIG. 5 a plot of changes in end group concentration with changes of molecular weight. The carboxyl/hydroxyl ratio decreases to a minimum in intermediate molecular weight prepolymers (2000–5000) before increasing to a maximum in the high molecular weight polymer. This indicates that carboxyl end groups are reacted preferentially to the removal of hydroxyl groups (ethylene glycol molecules) by transesterification; otherwise the carboxyl/hydroxyl ratio would not exhibit such an extreme minimum. Once the carboxyl concentration is sufficiently low (e.g. equal to or less than 100 microequivalents per gram), polymerization proceeds primarily by transesterification.

As will be seen in the examples, it is herein demonstrated that 2-vessel polyester polymerization process is feasible. Depending upon apparatus employed, it may be desirable to include a third intermediate vessel to raise the molecular weight of the finisher feed material to such a level that prepolymer losses in the finisher overheads are insignificant. This solids problems is caused by flashing of ethylene glycol and low molecular weight prepolymer when the finisher feed is introduced to the vacuum in the finisher. Since the use of vacuum in an intermediate vessel would present similar solids problems and be susceptible to air degradation, an inert sweep to reduce the ethylene glycol and water partial pressures may be employed. By the use of an inert-swept vessel such as the bubble-cap column described in the examples, the relatively low molecular weight esterification product can be converted into an intermediate molecular weight polymer without experiencing a sudden drop in pressure. Thus low molecular weight solid losses from an intermediate prepolymerizer would be slight and would be significantly reduced in the finisher overheads. Further, degradation caused by air leaks into vacuum systems would be virtually non-existent. The use of a countercurrent inert gas sweep in a bubble-cap column allows the ethylene glycol and water partial pressures to vary from a mild vacuum at the column entrance to approaching 0 pressure at the exit.

The following examples together with comparative test results shown therein illustrate a preferred procedure to be followed in accordance with the instant invention. It should be understood however that the examples are illustrative only and not exclusive.

The bubble cap column which was used in most cases to increase molecular weight, was employed with or without a nitrogen or ethylene glycol sweep. A vacuum devolutizer or finisher was employed in the further polymerization of the prepolymers into high molecular weight polymers. All pertinent operating conditions of the esterification reactor in its use to determine optimum conditions for the preparation of an esterification product in accordance with the instant invention are shown as follows:

TABLE 3.—REACTOR

| | Temp., °C. | Pressure, p.s.i.g. | Agitator, r.p.m. | Residence time, hr. |
|---|---|---|---|---|
| Example: | | | | |
| 1 | 270 | Atmospheric | 400 | 2.48 |
| 2 | 270 | do | 600 | 2.46 |
| 3 | 270 | do | 800 | 2.50 |
| 4 | 270 | do | 700 | 3.98 |
| 5 | 270 | do | 700 | 3.03 |
| 6 | 270 | do | 700 | 1.93 |
| 7 | 260 | do | 700 | 5.04 |
| 8 | 260 | do | 700 | 4.33 |
| 9 | 260 | do | 700 | 3.19 |
| 10 | 260 | do | 700 | 2.60 |
| 11[1] | 270 | do | 700 | 3.04 |
| 12 | 280 | do | 700 | 1.9 |

[1] No antimony glycoloxide in reactor feed slurry.

Employment of the above conditions with due regard for the considerations explained above resulted in prepolymers having the characteristics shown below.

TABLE 4

| | Measured quantities | | | Calculated quantities | | |
|---|---|---|---|---|---|---|
| | COOH, μeq./gm. | Mn, gm./mole | OH, μeq./gm. | COOH/OH | ET/TA, mole/mole | Esterification, percent |
| Example: | | | | | | |
| 1 | 654 | 1,100 | 1,166 | 0.56 | 1.05 | 93.6 |
| 2 | 697 | 1,000 | 1,302 | 0.54 | 1.06 | 93.2 |
| 3 | 654 | 950 | 1,457 | 0.45 | 1.08 | 93.6 |
| 4 | 547 | 955 | 1,547 | 0.35 | 1.10 | 94.5 |
| 5 | 560 | 990 | 1,460 | 0.38 | 1.09 | 94.5 |
| 6 | 1,426 | 818 | 1,016 | 1.40 | 0.96 | 86.0 |
| 7 | 449 | 705 | 2,389 | 0.19 | 1.20 | 95.4 |
| 8 | 542 | 780 | 2,022 | 0.27 | 1.15 | 94.5 |
| 9 | 1,140 | 745 | 1,543 | 0.74 | 1.04 | 88.8 |
| 10 | 1,412 | 640 | 1,714 | 0.82 | 1.03 | 86.0 |
| 11 | 752 | 870 | 1,548 | 0.49 | 1.08 | 92.5 |
| 12 | 910 | 860 | 1,413 | 0.64 | 1.05 | 91.1 |

EXAMPLES

All examples of prepolymers described herein were produced substantially in accordance with the flow sheet shown at FIG. 5 with the exception that in certain cases the use of the bubble-cap column was eliminated. A feed charge consisting essentially of the following was in each case prepared in the mix tank, and fed into the stirred-tank esterifier from a feed tank as shown.

TABLE 2

| Component | Weight in feed | Wt. concentration in fiber, p.p.m. |
|---|---|---|
| Terephthalic acid, lb | 40 | |
| Ethylene glycol, lb | 30 | |
| Antimony glycoloxide, gm | 10.80 | 295 (Sb) |

It will be seen from the above and FIG. 1 that Examples 1, 2, 9, 10 and 12 are clearly without the critical carboxyl/hydroxyl ratio limits of the instant invention and therefore not efficiently polymerizable. Example 11, having a carboxyl/hydroxyl ratio of less than .5, is nevertheless just above the critical .46 maximum ratio for this molecular weight range, and therefore not further polymerizable with minimal finisher vacuum requirements. In evaluating such data it should be noted that however critical is the carboxyl/hydroxyl ratio, the accuracy of its measurements may often be questionable. Variations of as much as ±10% are not uncommon.

Table 5 reflects pertinent operating conditions of esterification reactor, bubble-cap column where used, and finisher for Examples 13–52, of which Examples 14–52 were carried through the finisher step in the production of high molecular weight polyester polymers. Beginning with Example 14 the ethylene glycol feed to the column was reduced, thereby reducing the reacting molar ratio of ethylene glycol to terephthalic acid and consequently, as will be shown, increasing the carboxyl end group concentrations.

The following shows chemical characterization of reactor tails stream in all examples where prepolymers were carried through the final polymerization step.

TABLE 6

| | Measured quantities | | | | Calculated quantities | | | | |
|---|---|---|---|---|---|---|---|---|---|
| | COOH, μeq./gm. | DEG/TA, mole/mole | Intrinsic viscosity | $M_v$, gm./mole | $M_n$, gm./mole | OH, μeq./gm. | COOH/OH | EG/TA, mole/mole | Esterification, percent |
| Example: | | | | | | | | | |
| 13 | 529 | 0.016 | | | 890 | 1,719 | 0.31 | 1.12 | 94.6 |
| 14 | 519 | 0.018 | | | 1,150 | 1,224 | 0.42 | 1.07 | 94.8 |
| 15 | 558 | 0.018 | | | 1,300 | 964 | 0.58 | 1.04 | 94.5 |
| 16 | 549 | 0.017 | | | 1,250 | 1,056 | 0.52 | 1.05 | 94.7 |
| 17 | 549 | 0.017 | | | 1,250 | 1,056 | 0.52 | 1.05 | 94.7 |
| 18 | 551 | 0.015 | | | 1,240 | 1,058 | 0.52 | 1.05 | 94.3 |
| 19 | 524 | 0.017 | 0.122 | 3,066 | 1,335 | 976 | 0.54 | 1.05 | |
| 20 | 429 | 0.022 | 0.113 | 2,736 | 1,190 | 1,251 | 0.34 | 1.10 | |
| 21 | 544 | 0.014 | 0.111 | 2,628 | 1,140 | 1,206 | 0.45 | 1.08 | |
| 22 | 497 | 0.028 | 0.088 | 1,859 | 808 | 1,903 | 0.26 | 1.17 | |
| 23 | 558 | 0.041 | 0.082 | 1,667 | 725 | 2,222 | 0.25 | 1.20 | |
| 24 | 591 | 0.045 | 0.082 | 1,698 | 739 | 2,119 | 0.28 | 1.18 | |
| 25 | 563 | 0.045 | 0.084 | 1,729 | 752 | 2,097 | 0.27 | 1.18 | |
| 26 | 591 | 0.038 | 0.083 | 1,698 | 739 | 2,119 | 0.28 | 1.18 | |
| 27 | 588 | 0.038 | 0.083 | 1,698 | 739 | 2,122 | 0.28 | 1.18 | |
| 28 | 430 | 0.020 | 0.112 | 2,700 | 1,175 | 1,265 | 0.35 | 1.10 | |
| 29 | 595 | 0.014 | 0.114 | 2,772 | 1,205 | 1,065 | 0.56 | 1.05 | |
| 30 | 562 | 0.016 | 0.108 | 2,522 | 1,110 | 1,238 | 0.45 | 1.08 | |
| 31 | 595 | 0.014 | 0.114 | 2,772 | 1,205 | 1,065 | 0.56 | 1.05 | |
| 32 | 541 | 0.016 | 0.111 | 2,628 | 1,144 | 1,209 | 0.45 | 1.08 | |
| 33 | 518 | 0.016 | 0.114 | 2,772 | 1,205 | 1,142 | 0.45 | 1.07 | |
| 34 | 500 | 0.017 | 0.110 | 2,592 | 1,130 | 1,270 | 0.39 | 1.09 | |
| 35 | 493 | 0.016 | 0.107 | 2,487 | 1,034 | 1,357 | 0.36 | 1.10 | |
| 36 | 489 | 0.016 | 0.109 | 2,557 | 1,110 | 1,311 | 0.37 | 1.10 | |
| 37 | 506 | 0.016 | 0.108 | 2,522 | 1,100 | 1,313 | 0.39 | 1.09 | |
| 38 | 486 | 0.017 | 0.108 | 2,522 | 1,100 | 1,334 | 0.36 | 1.10 | |
| 39 | 526 | 0.014 | 0.114 | 2,772 | 1,205 | 1,134 | 0.46 | 1.07 | |
| 40 | 531 | 0.014 | 0.110 | 2,592 | 1,130 | 1,239 | 0.43 | 1.08 | |
| 41 | 548 | 0.014 | 0.110 | 2,592 | 1,130 | 1,202 | 0.44 | 1.08 | |
| 42 | 454 | 0.015 | 0.112 | 2,700 | 1,175 | 1,246 | 0.36 | 1.09 | |
| 43 | 488 | 0.013 | 0.110 | 2,592 | 1,130 | 1,282 | 0.38 | 1.09 | |
| 44 | 515 | 0.014 | 0.103 | 2,349 | 1,020 | 1,445 | 0.36 | 1.11 | |
| 45 | 417 | 0.021 | 0.115 | 3,059 | 1,328 | 1,090 | 0.38 | 1.08 | 95.1 |
| 46 | 515 | 0.015 | 0.118 | 3,170 | 1,380 | 935 | 0.55 | 1.05 | 94.2 |
| 47 | 627 | 0.017 | 0.116 | 3,100 | 1,350 | 853 | 0.74 | 1.03 | 92.8 |
| 48 | 752 | 0.012 | 0.115 | 3,059 | 1,328 | 755 | 1.00 | 1.00 | 91.4 |
| 49 | 577 | 0.026 | 0.086 | 1,950 | 848 | 1,783 | 0.32 | 1.14 | 93.2 |
| 50 | 617 | 0.025 | 0.085 | 1,915 | 833 | 1,783 | 0.35 | 1.14 | 92.7 |
| 51 | 672 | 0.020 | 0.087 | 1,985 | 863 | 1,648 | 0.41 | 1.11 | 92.1 |
| 52 | 417 | 0.021 | 0.115 | 3,059 | 1,328 | 1,090 | 0.38 | 1.08 | 95.1 |

TABLE 5

| | Reactor | | | | Column | | | | | Finisher | | | | |
|---|---|---|---|---|---|---|---|---|---|---|---|---|---|---|
| Example | °C. | Pressure | Agitator, r.p.m. | Residence time, hr. | Tray temp., °C. | Bottom temp., °C. | EG/TA, mole/mole | $N_2$/TA, mole/mole | Residence time, hr. | Dowtherm temp., °C. | Agitator, r.p.m. | Residence time, hr. | Throughput, lb./hr. | Sp. visc., sp. |
| 13 | 280 | (¹) | 700 | 2.5 | 260 | 260 | | | 2.0 | | | | | |
| 14 | 280 | (¹) | 700 | 2.5 | 260 | 260 | 1.0 | | 1.5 | 285 | 45 | 2.0 | 5.0 | 0.33 |
| 15 | 280 | (¹) | 700 | 2.5 | 260 | 260 | 0.10 | | 1.5 | 285 | 45 | 2.0 | 5.0 | 0.33 |
| 16 | 280 | (¹) | 700 | 2.5 | 260 | 260 | 0.10 | | 1.5 | 284 | 45 | 2.0 | 5.0 | 0.33 |
| 17 | 280 | (¹) | 700 | 2.5 | 260 | 260 | 0.10 | | 1.5 | 285 | 45 | 2.0 | 5.0 | 0.33 |
| 18 | 280 | (¹) | 700 | 2.5 | 260 | 260 | 0.05 | | 1.5 | 285 | 45 | 2.0 | 5.0 | 0.33 |
| 19 | 280 | (¹) | 700 | 2.5 | | | | | | 285 | 45 | 2.0 | 5.0 | 0.33 |
| 20 | 290 | (¹) | 700 | 2.5 | | | | | | 285 | 45 | 2.0 | 5.0 | 0.33 |
| 21 | 270 | (¹) | 700 | 2.5 | | | | | | 285 | 45 | 2.0 | 5.0 | 0.33 |
| 22 | 270 | 26 | 600 | 2.5 | 280 | 280 | | | 2.0 | 285 | 45 | 2.0 | 5.0 | 0.33 |
| 23 | 270 | 42 | 400 | 2.5 | 280 | 280 | | | 2.0 | 285 | 45 | 2.0 | 5.0 | 0.33 |
| 24 | 270 | 42 | 400 | 2.5 | 280 | 280 | | 1.0 | 1.5 | 285 | 45 | 2.0 | 5.0 | 0.33 |
| 25 | 270 | 42 | 400 | 2.5 | 280 | 280 | | 1.5 | 1.5 | 285 | 45 | 2.0 | 5.0 | 0.33 |
| 26 | 270 | 42 | 400 | 2.5 | 280 | 280 | | 2.0 | 1.5 | 285 | 45 | 2.0 | 5.0 | 0.33 |
| 27 | 270 | 42 | 400 | 2.5 | 280 | 280 | | 0.5 | 1.5 | 285 | 45 | 2.0 | 5.0 | 0.33 |
| 28 | 280 | (¹) | 700 | 2.5 | 290 | 260 | 0.25 | | 1.5 | 285 | 45 | 2.0 | 5.0 | 0.33 |
| 29 | 270 | (¹) | 400 | 2.5 | 280 | 280 | | | 2.0 | 285 | 45 | 2.0 | 5.0 | 0.33 |
| 30 | 270 | (¹) | 700 | 2.5 | 280 | 280 | | | 2.0 | 285 | 45 | 2.0 | 5.0 | 0.33 |
| 31 | 270 | (¹) | 700 | 2.5 | 280 | 280 | | 0.50 | 1.5 | 285 | 45 | 2.0 | 5.0 | 0.33 |
| 32 | 270 | (¹) | 700 | 2.5 | 280 | 280 | | 0.87 | 1.5 | 285 | 45 | 2.0 | 5.0 | 0.33 |
| 33 ¹ | 270 | (¹) | 700 | 2.5 | 280 | 280 | | 1.00 | 1.5 | 285 | 45 | 2.0 | 5.0 | 0.33 |
| 34 | 270 | (¹) | 800 | 2.5 | 280 | 280 | | | 2.0 | 285 | 45 | 2.0 | 5.0 | 0.33 |
| 35 | 270 | (¹) | 700 | 2.5 | 280 | 280 | | 0.25 | 1.5 | 285 | 45 | 2.0 | 5.0 | 0.33 |
| 36 | 270 | (¹) | 600 | 2.5 | 280 | 280 | | | 2.0 | 285 | 45 | 2.0 | 5.0 | 0.33 |
| 37 | 270 | (¹) | 500 | 2.5 | 280 | 280 | | | 2.0 | 285 | 45 | 2.0 | 5.0 | 0.33 |
| 38 | 270 | (¹) | 400 | 2.5 | 280 | 280 | | | 2.0 | 285 | 45 | 2.0 | 5.0 | 0.33 |
| 39 | 275 | (¹) | 700 | 2.5 | 280 | 280 | | 0.25 | 1.5 | 285 | 45 | 2.0 | 5.0 | 0.33 |
| 40 | 270 | (¹) | 400 | 2.5 | 280 | 260 | 0.15 | | 1.5 | 285 | 45 | 2.0 | 5.0 | 0.33 |
| 41 | 270 | (¹) | 400 | 2.5 | 280 | 260 | 0.05 | | 1.5 | 285 | 45 | 2.0 | 5.0 | 0.33 |
| 42 | 290 | (¹) | 700 | 2.5 | | | | | | 285 | 45 | 2.0 | 5.0 | 0.33 |
| 43 | 280 | (¹) | 700 | 2.5 | | | | | | 285 | 45 | 2.0 | 5.0 | 0.33 |
| 44 | 270 | (¹) | 700 | 2.5 | | | | | | 285 | 45 | 2.0 | 5.0 | 0.33 |
| 45 | 290 | (¹) | 700 | 2.7 | | | | | | | | | | |
| 46 | 290 | (¹) | 700 | 2.1 | | | | | | | | | | |
| 47 | 290 | (¹) | 700 | 1.6 | | | | | | | | | | |
| 48 | 290 | (¹) | 700 | 1.3 | | | | | | | | | | |
| 49 | 270 | 26 | 400 | 1.7 | | | | | | | | | | |
| 50 | 270 | 26 | 400 | 1.4 | | | | | | | | | | |
| 51 | 270 | 26 | 400 | 1.0 | | | | | | | | | | |
| 52 | 270 | (¹) | 700 | 2.7 | 290 | 290 | 1.02 | 1.5 | 2.0 | 290 | 4 | 3.0 | 5.0 | 0.48 |

¹ Atmospheric.

It will be noted that in many of the examples shown in Table 6, carboxyl/hydroxyl ratio of the reactor product is not within the limitations prescribed in accordance with the instant invention for efficient polymerization.

Most of the examples shown at Table 6 were further carried through the bubble-cap column described above, and the chemical characteristics of the column tails streams, in terms of measured quantities and calculated quantities are as follows:

TABLE 8.—Continued

| | Fiber properties | | | |
|---|---|---|---|---|
| | COOH, μeq./gm. | DEG, mole percent | Specific Viscosity | Finisher vacuum mm. Hg |
| 42 | 47 | 1.75 | 0.33 | 6.9 |
| 43 | 53 | 1.29 | 0.33 | 7.1 |
| 44 | 39 | 1.18 | 0.33 | 6.4 |
| 52 | 43 | 1.27 | 0.48 | 1.0 |

TABLE 7

| | Measured quantities | | | Calculated quantities | | | | |
|---|---|---|---|---|---|---|---|---|
| Ex. | COOH, μeq./gm. | DEG/TA, mole/mole | Intrinsic viscosity | $M_v$, gm./mole | $M_n$, gm./mole | OH, μeq./gm. | COOH/OH | EG/TA, mole/mole |
| 14 | 73 | 0.030 | 0.076 | 1,487 | 647 | 3,022 | 0.02 | 1.37 |
| 15 | 269 | 0.030 | | | 1,200 | 1,369 | 0.20 | 1.13 |
| 16 | 195 | 0.045 | | | 1,260 | 1,395 | 0.14 | 1.14 |
| 17 | 195 | 0.045 | 0.100 | 2,247 | 980 | 1,845 | 0.11 | 1.20 |
| 18 | 233 | 0.043 | 0.108 | 2,522 | 1,100 | 1,587 | 0.15 | 1.16 |
| 22 | 162 | 0.037 | 0.119 | 2,955 | 1,285 | 1,395 | 0.12 | 1.15 |
| 23 | 144 | 0.055 | 0.116 | 2,844 | 1,240 | 1,246 | 0.12 | 1.13 |
| 24 | 36 | 0.044 | 0.197 | 6,389 | 2,780 | 684 | 0.05 | 1.08 |
| 25 | 28 | 0.043 | 0.224 | 7,894 | 3,400 | 561 | 0.05 | 1.06 |
| 26 | 30 | 0.039 | 0.236 | 8,467 | 3,685 | 513 | 0.06 | 1.06 |
| 27 | 39 | 0.041 | 0.176 | 5,376 | 2,340 | 816 | 0.05 | 1.09 |
| 28 | 34 | 0.035 | 0.092 | 1,982 | 862 | 2,286 | 0.01 | 1.28 |
| 29 | 395 | 0.024 | 0.141 | 3,843 | 1,670 | 800 | 0.49 | 1.05 |
| 30 | 345 | 0.033 | 0.149 | 4,169 | 1,813 | 757 | 0.46 | 1.05 |
| 31 | 395 | 0.024 | 0.141 | 3,843 | 1,670 | 800 | 0.49 | 1.05 |
| 32 | 116 | 0.020 | 0.212 | 7,159 | 3,120 | 526 | 0.22 | 1.05 |
| 33 | 118 | 0.017 | 0.229 | 8,108 | 3,530 | 448 | 0.26 | 1.04 |
| 34 | 92 | 0.018 | 0.241 | 8,778 | 3,820 | 432 | 0.21 | 1.04 |
| 35 | 284 | 0.024 | 0.141 | 3,843 | 1,670 | 916 | 0.31 | 1.07 |
| 36 | 129 | 0.012 | 0.189 | 6,014 | 2,620 | 635 | 0.20 | 1.06 |
| 37 | 116 | 0.020 | 0.190 | 6,060 | 2,640 | 643 | 0.18 | 1.06 |
| 38 | 311 | 0.026 | 0.142 | 3,883 | 1,690 | 871 | 0.36 | 1.06 |
| 39 | 314 | 0.028 | 0.146 | 4,046 | 1,760 | 823 | 0.38 | 1.06 |
| 40 | 144 | 0.023 | 0.104 | 2,384 | 1,040 | 1,781 | 0.08 | 1.20 |
| 41 | 236 | 0.022 | 0.117 | 2,881 | 1,255 | 1,357 | 0.18 | 1.13 |
| 42[1] | 360 | 0.020 | 0.123 | 3,103 | 1,350 | 1,120 | 0.32 | 1.09 |
| 52 | 113 | 0.0124 | 0.275 | 10,741 | 4,670 | 315 | 0.36 | 1.02 |

[1] Sample obtained from column bottoms.

The following examples, which were carried through the final polymerization step in a vacuum finisher under conditions held constant for all runs, reflect corresponding fiber properties shown and required finished vacuum as follows:

TABLE 8

| | Fiber properties | | | |
|---|---|---|---|---|
| | COOH, μeq./gm. | DEG, mole percent | Specific Viscosity | Finisher vacuum mm. Hg |
| Example: | | | | |
| 14 | 15 | 2.54 | 0.33 | 1.8 |
| 15 | 28 | 2.20 | 0.33 | 4.1 |
| 16 | 33 | 2.25 | 0.33 | 4.6 |
| 17 | 28 | 2.15 | 0.30 | 5.1 |
| 18 | 41 | 2.12 | 0.33 | 5.2 |
| 19 | 65 | 1.90 | 0.33 | 4.4 |
| 20 | 54 | 2.15 | 0.33 | 5.4 |
| 21 | 64 | 1.58 | 0.33 | 3.7 |
| 22 | 24 | 4.20 | 0.33 | 4.6 |
| 23 | 24 | 4.89 | 0.33 | 4.1 |
| 24 | 19 | 4.56 | 0.33 | 5.5 |
| 25 | 25 | 4.43 | 0.33 | 6.1 |
| 26 | 26 | 4.32 | 0.33 | 6.7 |
| 27 | 20 | 4.70 | 0.33 | 4.9 |
| 28 | 19 | 2.90 | 0.33 | 2.6 |
| 29 | 70 | | | ≤1.0 |
| 30 | 51 | 2.26 | 0.33 | 6.8 |
| 31 | 70 | | | ≤1.0 |
| 32 | 40 | 1.96 | 0.33 | 8.6 |
| 3 | 47 | 1.98 | 0.33 | 9.2 |
| 34 | 45 | 1.95 | 0.33 | 10.6 |
| 35 | 40 | 2.78 | 0.33 | 6.6 |
| 36 | 33 | 2.19 | 0.33 | 7.0 |
| 37 | 29 | 1.95 | 0.33 | 6.9 |
| 38 | 55 | 2.32 | 0.33 | 5.8 |
| 39 | 52 | 2.34 | 0.33 | 6.9 |
| 40 | 23 | 2.25 | 0.33 | 3.8 |
| 41 | 27 | 2.34 | 0.33 | 5.1 |

Excessive finished vacuum requirements are clearly shown for Examples 14, 28, 29 and 31, in each of which examples, as shown at Table 8, the prepolymer was characterized by carboxyl concentrations and carboxyl/hydroxyl end-group ratios outside the critical range defined in accordance with the practice of this invention. Example 52 typifies the production in accordance with this invention of high molecular weight polymers suitable for tire cords and the like.

It is to be understood that changes and variations may be made in present invention without departing from the spirit and scope thereof as defined in the appended claims.

We claim:

1. In a process for producing a high molecular weight polyester polymer consisting of the steps of esterifying a dicarboxylic acid with a glycol under acid esterification conditions, and then of polymerizing the prepolymer in a finisher, the improvement comprising (1) determining reaction conditions for the esterification step which will provide the most efficient combinations of reactions for both steps by sampling the prepolymer, measuring the carboxyl end group concentration of the sample prepolymer by titration, and measuring the number average molecular weight of the sample prepolymer; (2) adjusting product residence time, temperature, pressure, and mole ratio of the dicarboxylic acid to the glycol so as to obtain a prepolymer having a molecular weight of from 980 to 4670 and a carboxyl end group concentration of about $6.7(10^6)M_n^{-1.35}$ where $M_n$ is the number average molecular weight of the prepolymer; and (3) employing the adjusted conditions in continuous preparation of said prepolymer.

2. The method improvement of claim 1 wherein the dicarboxylic acid is terephthalic acid and the glycol is ethylene glycol.

3. The method improvement of claim 2 wherein selection and employment of prepolymer reactor esterification conditions are further related to the resulting concentration of diethylene glycol, and the concentration of diethylene glycol in the prepolymer is no more than about .02 mole per mole of terephthalic acid.

4. The improvement of claim 1 wherein the esterification step is conducted in a single vessel esterifier, and the second polymerization step is conducted in a single vessel finisher.

5. In a process for producing a high molecular weight polyester polymer consisting of the steps of esterifying a dicarboxylic acid with a glycol under acid esterification conditions, and then of polymerizing the prepolymer in a finisher, the improvement comprising (1) determining reaction conditions for the esterification step which will provide the most efficient combinations of reactions for both steps by sampling the prepolymer, measuring the carboxyl end group concentration of the sample prepolymer by titration, and measuring the number average molecular weight of the sample prepolymer; (2) adjusting product residence time, temperature, pressure, and mole ratio of the dicarboxylic acid to the glycol so as to obtain a prepolymer having a molecular weight of from about 1000 to about 1800 units, and the ratio of carboxyl to hydroxyl end groups of from about 0.33 to not more than 0.46; and (3) employing the adjusted conditions in the continuous preparation of said prepolymer.

References Cited

UNITED STATES PATENTS

| | | | |
|---|---|---|---|
| 2,855,432 | 10/1958 | Binder | 260—475 |
| 2,907,753 | 10/1959 | MacLean et al. | 260—75 |
| 3,050,548 | 8/1962 | Munro et al. | 260—475 |
| 3,185,670 | 5/1965 | McKinney | 260—75 |

FOREIGN PATENTS

| | | |
|---|---|---|
| 776,282 | 6/1957 | Great Britain. |
| 1,001,787 | 8/1965 | Great Britain. |
| 1,013,034 | 12/1965 | Great Britain. |

OTHER REFERENCES

Goodman et al., Polyesters, vol. I, Elsevier, New York 1965 (pp. 14–17).

Kirk-Othmer, Encycl. of Chem. Technol., 2d ed. vol. 16, 163–64, 174 (1968).

WILLIAM H. SHORT, Primary Examiner

MELVIN GOLDSTEIN, Assistant Examiner

U.S. Cl. X.R.

260—475